D. B. GOSS.
BUMPER AND TIRE CARRIER.
APPLICATION FILED AUG. 4, 1921.
1,393,113.
Patented Oct. 11, 1921.
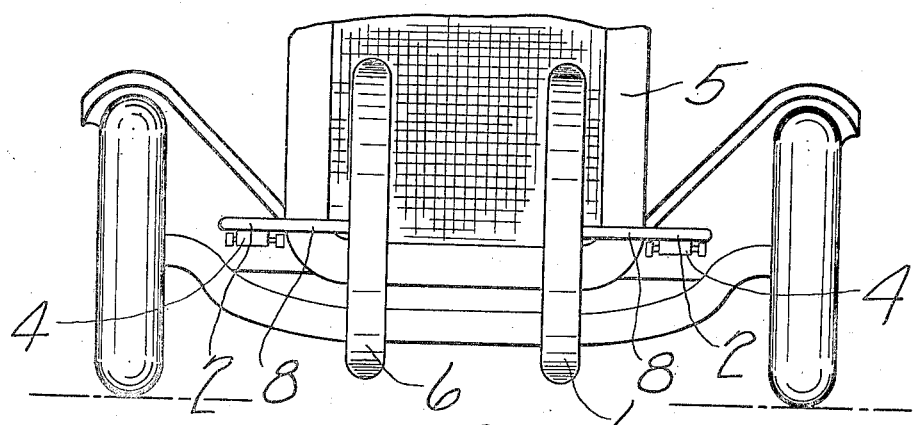
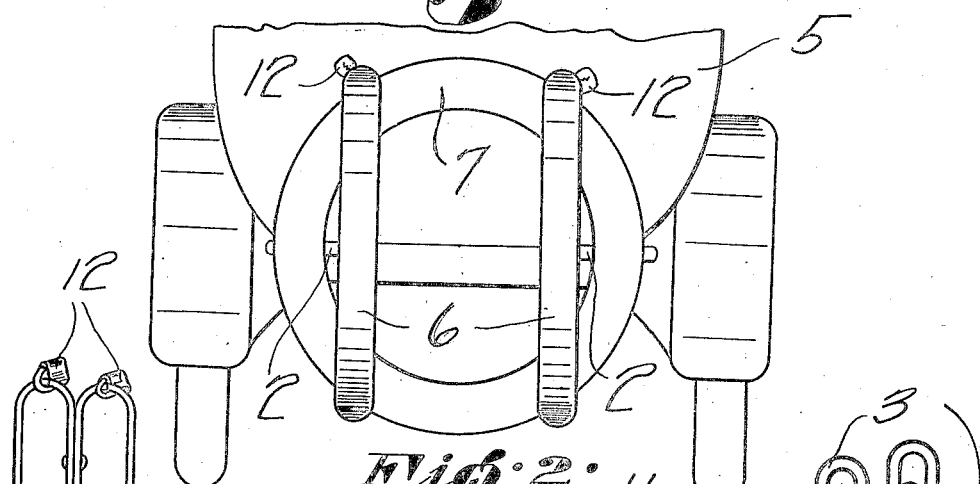
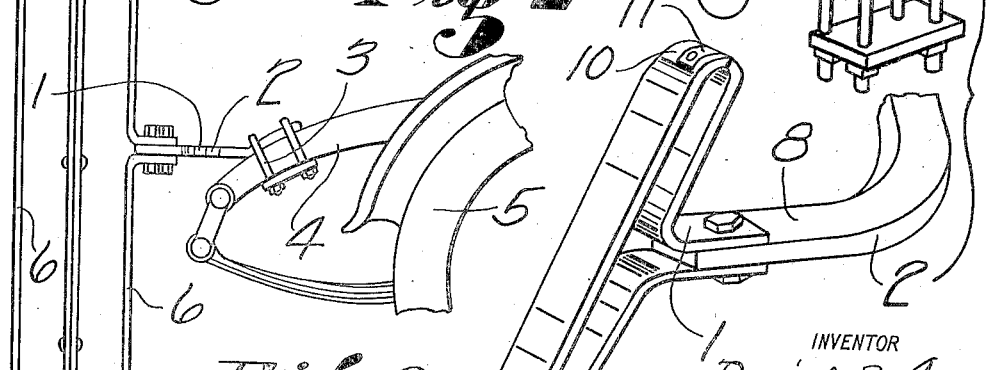
INVENTOR
Daniel B. Goss
BY
Adam E. Fisher
ATTORNEY

UNITED STATES PATENT OFFICE.

DANIEL B. GOSS, OF CUYAHOGA FALLS, OHIO.

BUMPER AND TIRE-CARRIER.

1,393,113.  Specification of Letters Patent.  Patented Oct. 11, 1921.

Application filed August 4, 1921. Serial No. 489,796.

*To all whom it may concern:*

Be it known that I, DANIEL B. GOSS, a citizen of the United States, residing in the city of Cuyahoga Falls, county of Summit and State of Ohio, have invented new and useful Improvements in Bumpers and Tire-Carriers, of which the following is a specification, reference being had to the accompanying drawings.

This invention is in the nature of a combination bumper and tire carrier, and the object is to provide bumper elements attachable vertically to the front or rear springs of the machine, the said elements being adapted also to support one or more spare tires at the rear which act in turn to complete the function of the device as a bumper.

In the drawings:

Figure 1 is a frontal elevation of such bumper elements as attached to the front springs.

Fig. 2 is a rear elevation, showing tires supported in place.

Fig. 3 is a side elevation of a rear section of a machine equipped with these bumper elements.

Fig. 4 is a detail of one of the bumper elements detached, and showing a clamp for attachment to the spring of the automobile.

The invention consists of bumper elements 1, embodying horizontally disposed arms 2 with clamps 3 at their ends adapted to engage the springs 4 of the car 5, and vertically disposed loops 6 at the opposite ends of these arms adapted to engage the spare tires 7. The precise form of the clamps 3 would vary according to the particular type of car to which the elements are to be attached, and the arms 2 may be bent inwardly on a horizontal plane, as shown at 8 in Fig. 4, to bring the loops 6 sufficiently close together to engage the spare tires 7. The loops 6, especially of the elements designed for attachment to the rear springs, are hinged at their lower ends, as at 9, and are mortised and tongued at their upper ends as shown at 10 and 11, so as to engage a lock 12 for locking the loops and securing the spare tires in place.

The looped elements 1 will in themselves serve as efficient bumpers at the front or rear of a machine; at a rear however they act in addition as tire carriers, as stated. Of course, spare tires could be similarly carried at the front, if desired.

While I have herein described a certain specific method of constructing and assembling the elements of my invention, it is understood same may be varied in minor details, not departing from the spirit of my invention as defined in the appended claims.

I claim:

1. In combination with the springs of an automobile, a combined bumper and tire carrier, comprising horizontal arms secured to the springs; looped vertical elements at the opposite ends of the arms, said loops being adapted to hold spare tires.

2. In combination with the springs of an automobile, a combined bumper and tire carrier, comprising horizontal arms with clamps for securing to the springs, said arms being bent inwardly on a horizontal plane as required; looped vertical elements at the opposite ends of the arms, said loops being hinged at their lower ends and having fastenings at their upper end, and being thus adapted to hold spare tires.

DANIEL B. GOSS.

Witnesses:
F. T. WILLIAMS,
GEO. GREEN.